(12) United States Patent
Manninen

(10) Patent No.: US 9,194,082 B2
(45) Date of Patent: Nov. 24, 2015

(54) MULTI-PIN NONWOVEN SEAMING ELEMENT

(71) Applicant: AstenJohnson, Inc., Charleston, SC (US)

(72) Inventor: Allan R Manninen, Stittsville (CA)

(73) Assignee: AstenJohnson, Inc., Charleston, SC (US)

( * ) Notice: Subject to any disclaimer, the term of this patent is extended or adjusted under 35 U.S.C. 154(b) by 289 days.

(21) Appl. No.: 13/884,119

(22) PCT Filed: Dec. 11, 2012

(86) PCT No.: PCT/CA2012/001138
§ 371 (c)(1),
(2) Date: May 8, 2013

(87) PCT Pub. No.: WO2013/086609
PCT Pub. Date: Jun. 20, 2013

(65) Prior Publication Data
US 2014/0053376 A1    Feb. 27, 2014

(30) Foreign Application Priority Data
Dec. 16, 2011   (CA) ..................................... 2762349

(51) Int. Cl.
*F16G 3/02* (2006.01)
*F16G 3/04* (2006.01)
*D21F 7/10* (2006.01)
*D21F 1/00* (2006.01)

(52) U.S. Cl.
CPC ................ *D21F 7/10* (2013.01); *D21F 1/0054* (2013.01); *F16G 3/02* (2013.01); *F16G 3/04* (2013.01); *Y10T 24/34* (2015.01); *Y10T 24/45005* (2015.01); *Y10T 24/45152* (2015.01); *Y10T 29/4995* (2015.01); *Y10T 29/49966* (2015.01)

(58) Field of Classification Search
CPC .......... F16G 3/02; F16G 3/04; Y10T 24/162; Y10T 24/1632; Y10T 24/164; Y10T 24/1688; Y10T 24/1644
USPC .................. 24/33 M, 33 P, 33 B, 33 K, 31 H; 198/844.2
See application file for complete search history.

(56) References Cited

U.S. PATENT DOCUMENTS

| 1,998,135 | A | * | 4/1935 | Heinz ............................ 24/33 C |
| 3,438,096 | A | * | 4/1969 | McComb ....................... 24/33 B |
| 2011/0192561 | A1 | * | 8/2011 | Breuer et al. ................. 162/200 |

FOREIGN PATENT DOCUMENTS

| WO | 2010121360 A1 | 10/2010 |
| WO | 2011100157 A1 | 8/2011 |

OTHER PUBLICATIONS

International Search Report and Written Opinion dated Mar. 8, 2013 for International Application Serial No. PCT/CA2012/001138, International Filing Date: Dec. 11, 2012 consisting of 9 pages.

*Primary Examiner* — Robert J Sandy
(74) *Attorney, Agent, or Firm* — Christopher & Weisberg, P.A.

(57) ABSTRACT

A seaming element for seaming an industrial textile, an industrial textile, and a method of seaming. A first region of the seaming element comprises at least one securing member, and a second region is securable to the textile. Spaced-apart protrusions in the securing members are interdigitatable with corresponding protrusions in an opposing element, or the other seamable edge of the textile. Opposing protrusions are interdigitated to define first and second channels for securing means. Where the seaming element has two or more securing members, the protrusions of the outer securing member are aligned with those of an inner securing member of the opposing element, and the protrusions of an inner securing member are aligned with those of the outer securing member of the opposing element. Where the securing means is a pintle, the free ends can be inserted back into the channel to secure the seam.

17 Claims, 11 Drawing Sheets

MULTI-PIN NONWOVEN SEAMING ELEMENT

CROSS-REFERENCE TO RELATED APPLICATIONS

This application is a Submission Under 35 U.S.C. 371 for U.S. National Stage Patent Application of, and claims priority to, International Application Number PCT/CA2012/001138, filed Dec. 11, 2012, entitled MULTI-PIN NONWOVEN SEAMING ELEMENT, which claims priority to Canadian Application Serial No. 2,762,349, filed Dec. 16, 2011, the entirety of all of which are incorporated herein by reference.

FIELD OF THE INVENTION

This invention relates to industrial textiles, and in particular to a seaming element and a method of seaming of industrial textiles.

BACKGROUND OF THE INVENTION

Prior art seaming elements (e.g. WO 2010/121360 to Manninen) include nonwoven seaming elements which are formed from an oriented polymer film. One of a pair of such seaming elements can be attached at each end or edge of a textile to be joined, and looped portions at the free edge regions of the two elements can be interdigitated to provide a channel suitable for receiving a securing means such as a pintle. The dimensions for the seaming elements are selected so as to be compatible with the textile to be seamed, in particular as to thickness so as to minimize or avoid any discontinuity at the seaming area.

It has now been found that a seaming element can be constructed so as to provide two or more looped regions, thereby creating at least two channels across the seam, which allows for improved distribution of the tensile load across the element. The element can be constructed from two or more layers of an oriented polymer film, so that the same total element thickness can be obtained using thinner film, which allows for significantly improved biaxial orientation and thus maximization of the physical properties, in particular tensile strength. In addition, thinner films can better accommodate tight (smaller) bending radii and are thus better able to successfully wrap smaller diameter pintle pins without suffering mechanical failures such as cracking or other fatigue related issues. Alternatively the element can be constructed as an extruded body having two or more looped regions and a total body thickness suitable for the intended end use.

The seaming elements of the invention can be secured to the seamable end or edge of the textile by any suitable means, including bonding, either to compressed yarn ends of a woven textile, or to appropriate selected surfaces of a non-woven textile, including a textile comprising one or more layers of film.

It has further been found that the channels can be dimensioned so as to provide sufficient space in which the free ends of pintles can be turned back into the channel to secure the ends.

SUMMARY OF THE INVENTION

The invention seeks to provide a seaming element for seaming a first seamable edge region of an industrial textile to a second seamable edge region of the industrial textile, the seaming element comprising a first lateral edge region and a second lateral edge region, wherein (i) the second lateral edge region is constructed and arranged to be securably affixed to the first seamable edge region; and
(ii) the first lateral edge region comprises at least one securing member, each securing member comprising a plurality of spaced-apart aligned channelled protrusions, wherein
either (a) the first lateral edge region comprises a single securing member constructed and arranged to be secured within a first fold region provided at the first seamable edge of the industrial textile, in spaced-apart relationship from protrusions provided at the first fold region, wherein the protrusions of the securing member define a first channel and the protrusions at the first fold region define a second channel; or
(b) the first lateral edge region comprises an outer securing member and at least one inner securing member, wherein
(A) the protrusions of the outer securing member are interdigitatable and alignable with the protrusions of one of the at least one inner securing member of a corresponding second seaming element securably affixed to the second seamable edge region of the textile, to define a first channel; and
(B) the protrusions of one of the at least one inner securing member are interdigitatable and alignable with the protrusions of the outer securing member of the corresponding second seaming element, to define a second channel.

Preferably, the seaming element comprises a film. Where it comprises two securing members, preferably the outer securing member comprises a first layer of film, and each inner securing member comprises an additional layer of film. In such case, preferably each securing member is secured to an adjacent securing member and an innermost inner securing member is constructed and arranged to be securable to the first seamable edge of the industrial textile; and more preferably, each securing member is secured to an adjacent securing member by bonding, preferably by laser welding.

Where the first seamable edge of the industrial textile comprises two layers, preferably a transition strip is provided between the two layers at the first seamable edge and extending beyond the first seamable edge, and the innermost inner securing member is constructed and arranged to be securable at portions of an inner surface to the transition strip.

Where the industrial textile is a woven textile, preferably the first and second seamable edges each comprise a compressed region, and the innermost inner securing member is constructed and arranged to be securable at portions of an inner surface to the compressed region.

As an alternative to being constructed of layers of film, the outer securing member can be integrally constructed with the at least one inner securing member, preferably constructed by a process selected from extrusion and molding, more preferably by injection molding.

Optionally, the seaming element can comprise a single securing member constructed and arranged to be secured to a profiled industrial textile by yarns inserted through the securing member and selected profiled portions of the textile.

Preferably, in the seaming elements of the invention, each of the first and second channel is constructed and arranged to receive a securing means, more preferably a pintle.

The invention further seeks to provide an industrial textile comprising at least one pair of seaming elements, each comprising at least two securing members and constructed according to the invention.

In an exemplary embodiment, the industrial textile has
(i) a first seamable end having a first fold region comprising first textile protrusions, and a second seamable end having a second fold region comprising second textile protrusions; and
(ii) a pair of seaming elements each comprising a single securing member comprising a plurality of spaced-apart aligned channelled protrusions, a first seaming element being secured within the first fold region, in spaced-apart relationship from the first textile protrusions, and a second seaming element being secured within the second fold region, in spaced-apart relationship from the second textile protrusions, wherein
the protrusions of the first seaming element are interdigitated and aligned with the second textile protrusions to define a first channel to receive a first securing means, and the protrusions of the second seaming element are interdigitated and aligned with the first textile protrusions to define a second channel to receive a second securing means.

Preferably, for the industrial textiles of the invention, each securing means comprises a pintle having a length exceeding a length of the respective channel, wherein protruding free ends of the pintle are secured back within the channel.

The invention further seeks to provide a method of providing a seam for an industrial textile, comprising
(a) preparing an opposed pair of seamable edges;
(b) providing and securing to each of the seamable edges a seaming element according to the invention;
(c) bringing the seaming elements and seamable edges together, interdigitating respective ones of the protrusions to provide at least a first channel and a second channel; and
(d) inserting a securing means in each channel to secure the seam.

Where the industrial textile is a woven textile, preferably step (a) comprises removing selected yarns proximate the seamable edges and compressing selected yarns at the seamable edges to form a compressed region at each seamable edge; and step (b) comprises securing the seaming elements to the compressed regions.

For the methods of the invention, preferably the securing means is a pintle, and step (d) comprises
(d.1) providing the pintle in a length exceeding a length of the seam and inserting it to protrude from each end of the channel;
(d.2) bending protruding portions of the pintle adjacent the channel; and
(d.3) inserting a free end of each protruding portion of the pintle into the channel to secure the seam.

BRIEF DESCRIPTION OF THE DRAWINGS

The invention will now be described in relation to the drawings, in which.

DETAILED DESCRIPTION OF THE DRAWINGS

Figure 1:
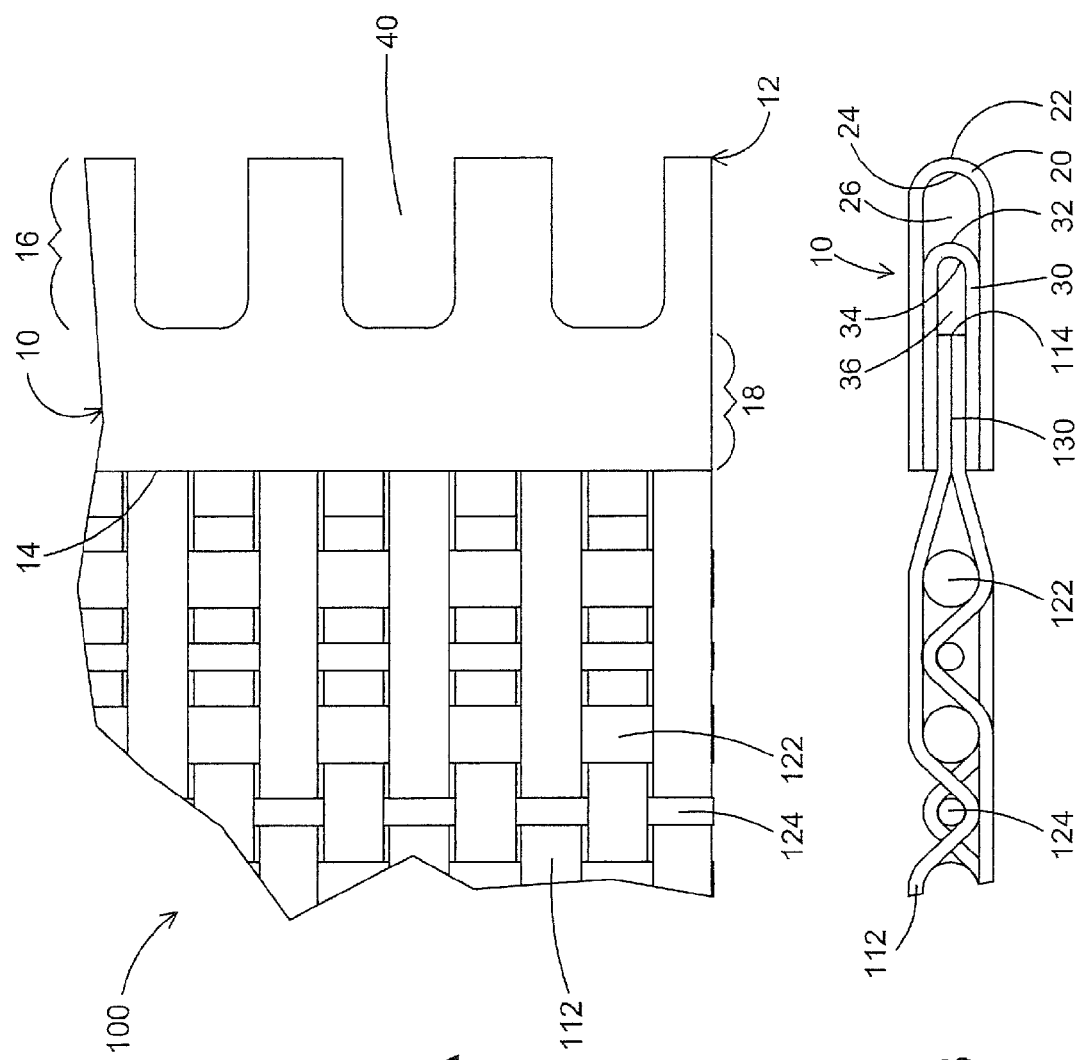
FIG. 1A is a plan view of a seaming element secured to an industrial textile in an embodiment of the invention.
FIG. 1B is a cross-sectional view of the seaming element and textile shown in FIG. 1A.
Figure 2:
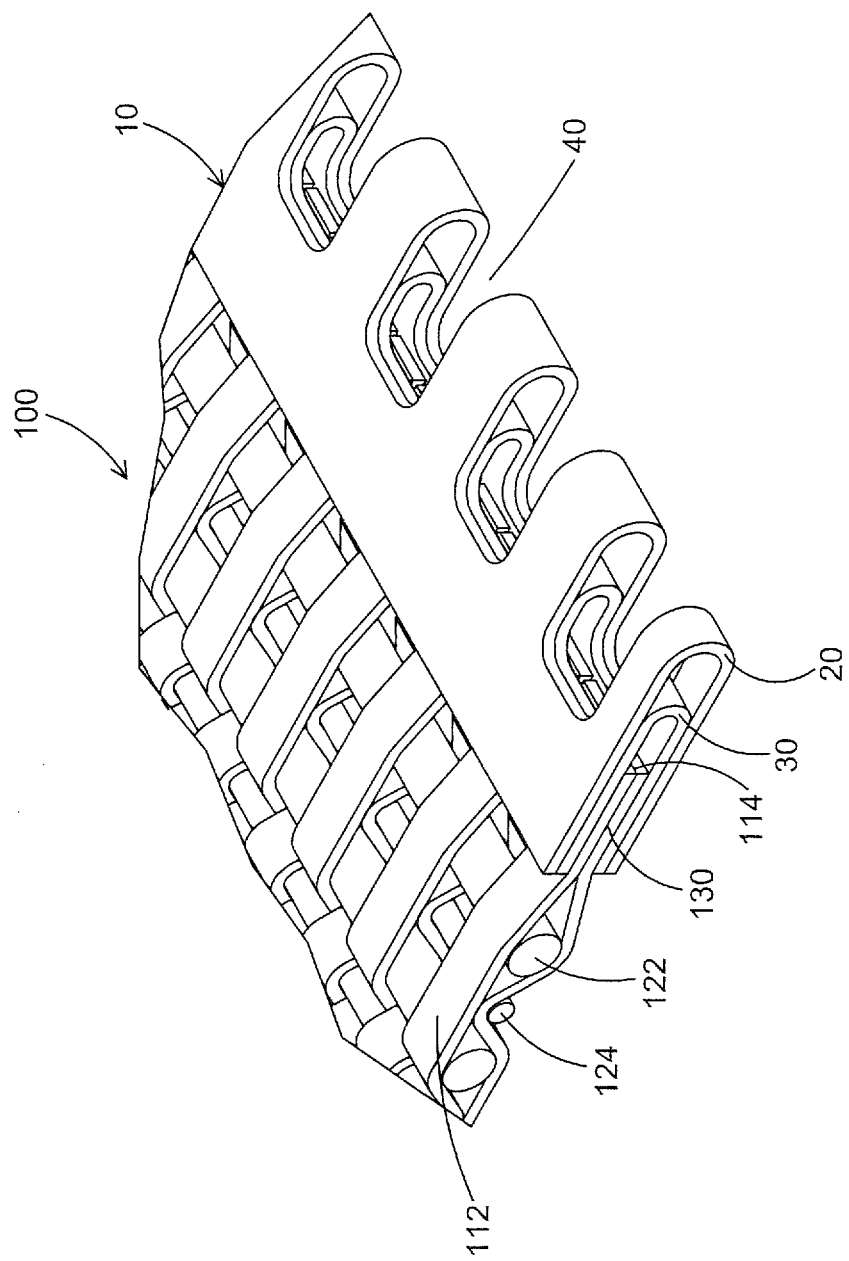
FIG. 2 is a perspective view of the seaming element and textile shown in FIG. 1A.

Referring first to FIGS. 1A, 1B and 2, these show a seaming element 10 secured to an industrial textile in an embodiment of the invention. The industrial textile can be of various woven or non-woven constructions, but is shown here as a woven fabric 100 constructed of first direction yarns 112 interwoven with transverse direction yarns 120, in which larger diameter yarns 122 are alternated with smaller diameter yarns 124. To provide a seamable end or edge for the fabric 100, a selected number of transverse direction yarns 120 are removed from fabric 100, and the first direction yarns 112 are compressed together to form compressed region 130.

Seaming element 10, as best seen from the perspective view in FIG. 2 together with the cross-sectional view in FIG. 1B, but also with reference to FIG. 1A, comprises two layers of film, folded about fold line 12. A continuous portion across seaming element 10 provides bond region 18, for secure attachment to fabric 100, and in second region 16, apertures 40 regularly spaced across seaming element 10 create a plurality of protruding loops, as an outer layer of outer loops 20 and an inner layer of inner loops 30. The two layers are aligned to provide spaces 26 between inner surfaces 24 of outer loops 20 and outer surfaces 32 of inner loops 30, such that spaces 26 provide a first channel across seaming element 10. Similarly, spaces 36 between inner surfaces 34 of inner loops 30 and cut ends 114 of yarns 112 in compressed region 130 provide a second channel across seaming element 10.

Figure 3:
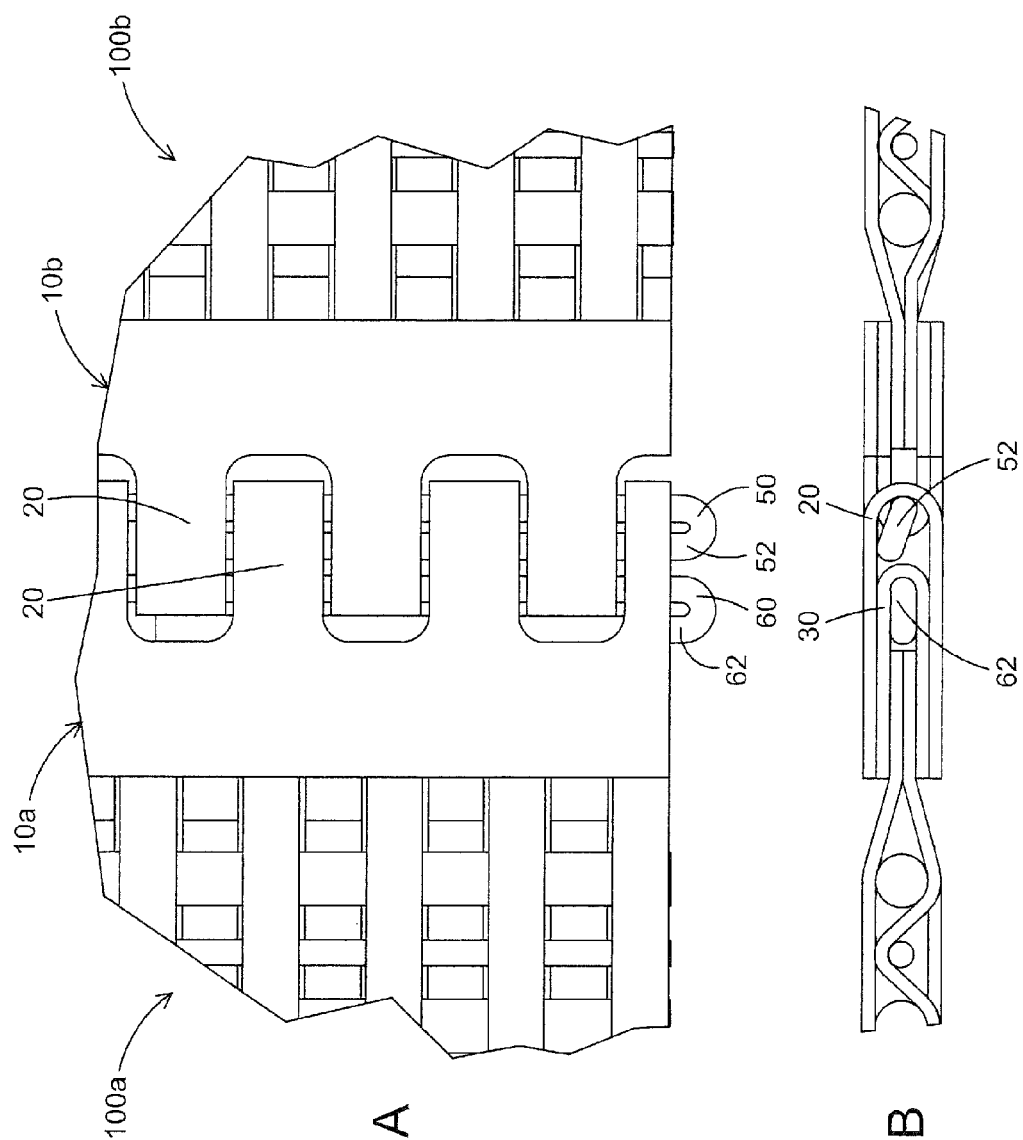
FIG. 3A is a plan view of a pair of seaming elements secured to an industrial textile and each other in a second embodiment of the invention.
FIG. 3B is a cross-sectional view of the seaming elements and textile shown in FIG. 3A.
Figure 4:
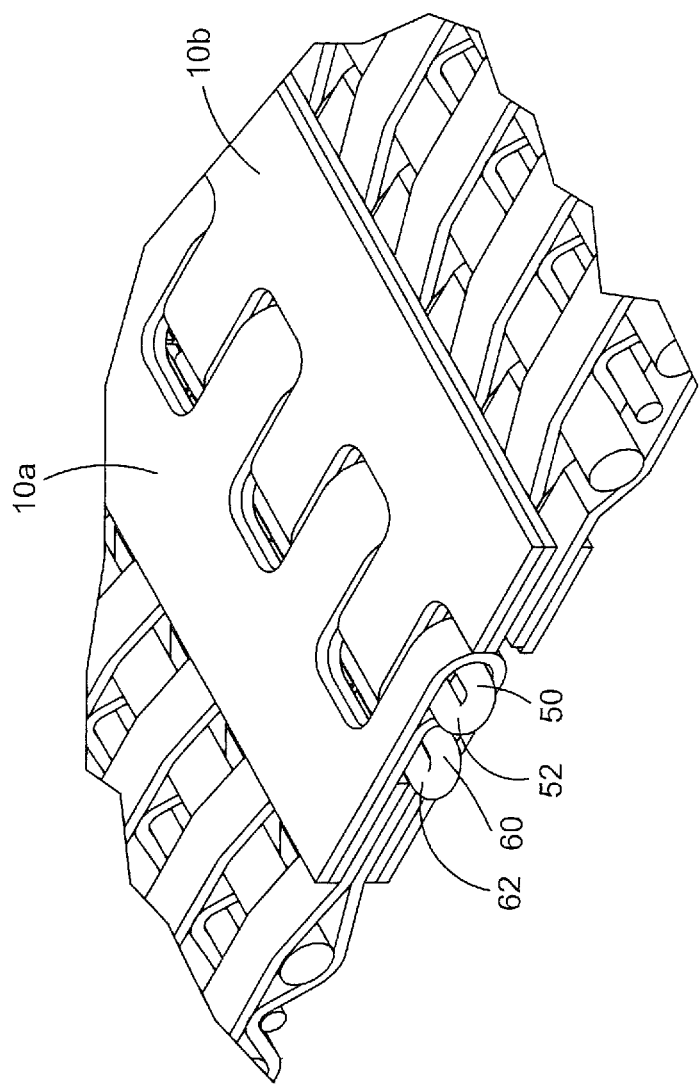
FIG. 4 is a perspective view of the seaming elements and textile shown in FIG. 3A.

When seaming element 10 is brought together in alignment with a corresponding seaming element 10 secured to an opposing end or edge of fabric 100, outer loops 20 and inner loops 30 in first seaming element 10 can be interdigitated with those of a compatible seaming element, preferably a second seaming element 10, so that the channel formed by spaces 26 in the first seaming element 10 is aligned with the channel formed by spaces 36 in the second seaming element 10, and the channel formed by spaces 26 in the second seaming element 10 is aligned with the channel formed by spaces 36 in the first seaming element 10, and each channel can be secured by a pintle, for example in the manner shown in FIGS. 3A, 3B and 4.

As discussed further below in relation to FIGS. 5 to 7, the two layers are suitably secured to each other and together to the fabric to be seamed. In the embodiment of FIGS. 1A, 1B and 2, inner surfaces 24 of outer loops 20 are secured to outer surfaces 32 of inner loops 30; and inner surfaces 34 of inner loops 30 are in turn secured to outer surfaces of yarns 112 at compressed region 130.

Referring to FIGS. 3A, 3B and 4, these show the securing of the seam after an opposed pair of seaming elements, here shown as seaming elements 10a, 10b, are secured to fabric ends 100a, 100b, and aligned with each other. In each channel formed by aligned spaces 26 and 36 provided by respective outer loops 20 and inner loops 30 of aligned elements 10a, 10b, a pintle is inserted, shown here as 50, 60. These pintles are provided with a length exceeding that of the channel across fabric ends 100a, 100b; after trimming, if required, to result in a protruding portion of workable length for each of pintles 50, 60, these portions, known as "pintle tails", can be bent to form loops 52, 62, and the tail reinserted into the appropriate aligned row of spaces 26, 36, to secure the pintles firmly within the aligned seaming elements 10a, 10b.

Figure 5:
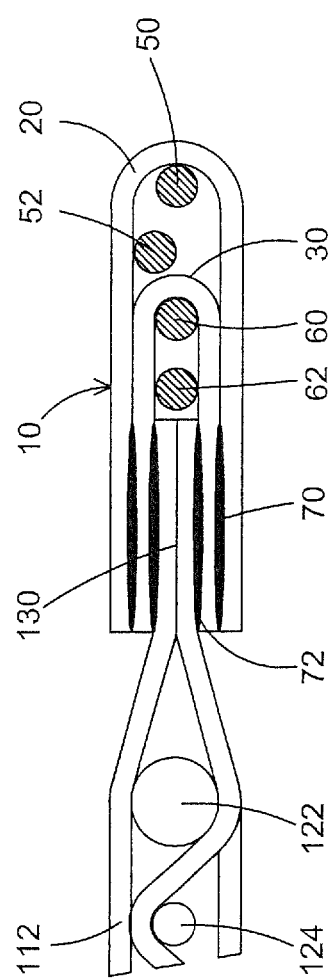
FIG. 5 is a cross-sectional view of a seaming element secured to a seamable end of an industrial textile in a third embodiment of the invention.

FIG. 5 shows a method of securing a seaming element of the invention, shown here as seaming element 10, to a woven fabric such as shown in FIG. 1A, woven from first yarns 112 interwoven with transverse yarns 122, 124, and having prepared compressed region 130. Outer loops 20 are bonded by suitable means, such as laser welding, at first bond regions 70 to inner loops 30; and inner loops 30 are bonded to compressed region 130 at second bond regions 72. As in the embodiment of FIGS. 3A, 3B and 4, pintles 50, 60 are shown as having been looped back and tails 52, 62 reinserted into the respective channels formed by outer loops 20 and inner loops 30.

Figure 6:
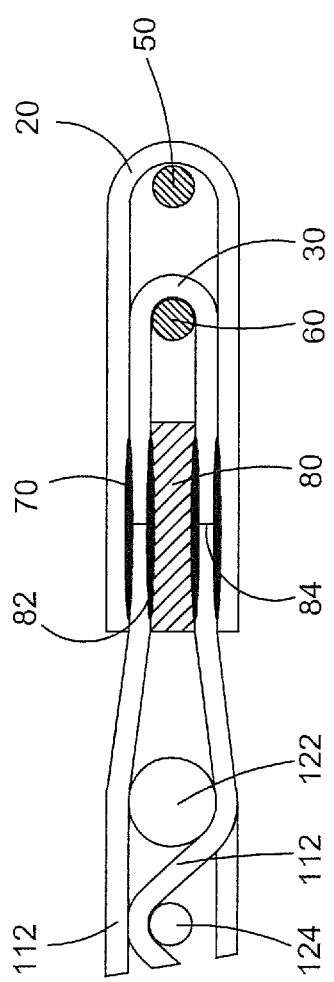
FIG. 6 is a cross-sectional view of a seaming element secured to a seamable end of an industrial textile in a fourth embodiment of the invention.

FIG. 6 shows an alternative method of securing a seaming element 610 of the invention. In this embodiment, ends of yarns 112 are partly compressed, but transition strip 80 is inserted between them. Transition strip 80 is bonded to inner surfaces of yarns 112 along part of its length, and along the remainder of its length to inner surfaces 34 of inner loops 30, at bond region 82. Ends of inner loops 30 are aligned to cut ends of yarns 112 at their butt ends 84, and inner surfaces 24 of outer loops 20, which extend beyond inner loops 30 and over the fabric, are bonded to both inner loops 30 and yarns 112 at bond regions 86. Pintles 50, 60 can be looped back into seaming element 610 in the manner discussed in relation to FIGS. 3A, 3B and 4.

Figure 7:
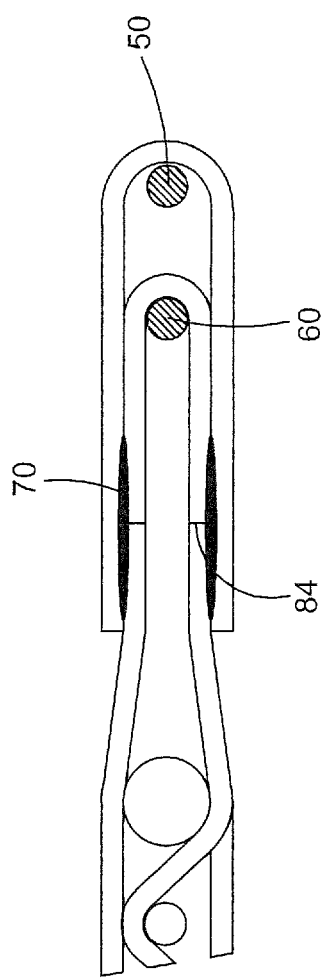
FIG. 7 is a cross-sectional view of a seaming element secured to a seamable end of an industrial textile in a fifth embodiment of the invention.

As a further alternative, as shown in FIG. 7, in conjunction with FIG. 6, depending on factors including the intended end use of the fabric, transition strip 80 can be omitted, and inner loops 30 may be welded over cut ends of yarns 112, inner surfaces 24 of outer loops 20 being bonded to yarns 112 and inner loops 30 at bond region 86 in the same manner as shown in FIG. 6.

Figure 8A:
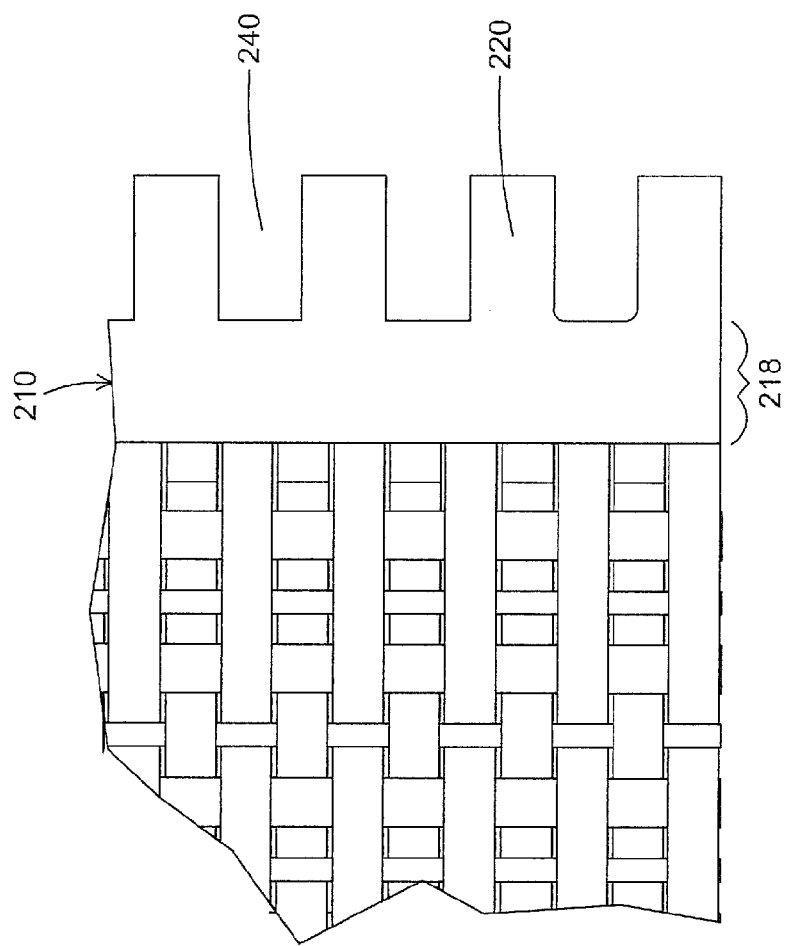
FIG. 8A is a plan view of a seaming element secured to an industrial textile in a sixth embodiment of the invention.
Figure 8B:
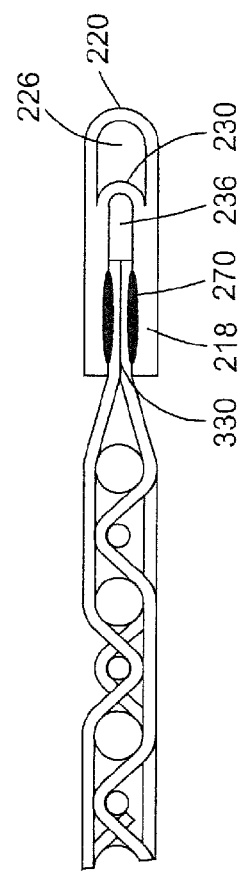
FIG. 8B is a cross-sectional view of the seaming element and textile shown in FIG. 8A.
Figure 9:
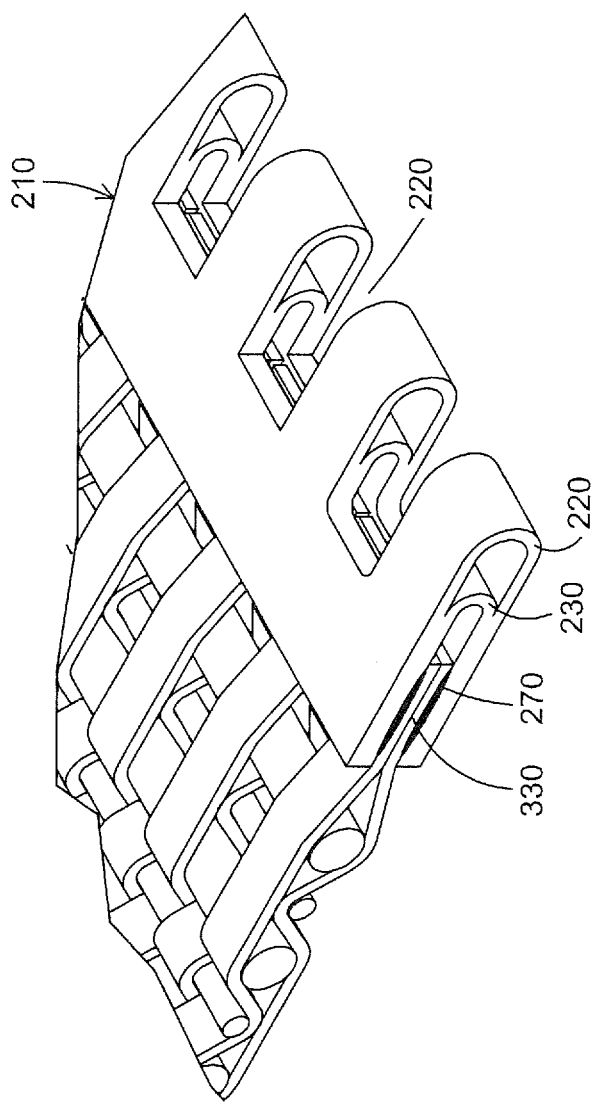
FIG. 9 is a perspective view of the seaming element and textile shown in FIG. 8A.

Referring now to FIGS. 8A, 8B and 9, a further embodiment of the seaming element of the invention is shown. Seaming element 210 is provided as an integrally constructed element, formed by a process such as extrusion, injection molding or other molding, to provide a non-layered element having a similar cross-sectional configuration to the layered film embodiments described above. Seaming element 210 comprises bond region 218, and second region 216, comprising outer loops 220 and inner loops 230, respectively providing spaces 226, 236 for insertion of securing means such as pintles (not shown). Yarn ends of the textile are compressed at compressed region 330, which is bonded to the inner surfaces of seaming element 210 by strip 270 at bond region 218.

Figure 10:
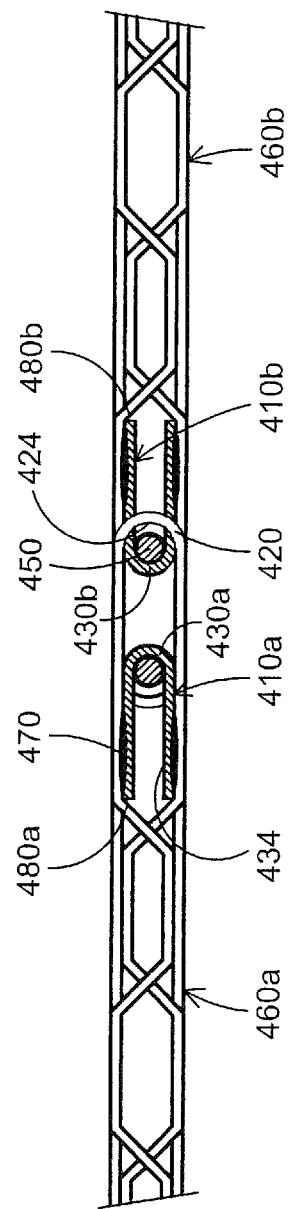
FIG. 10 is a cross-sectional view of a pair of seaming elements secured to an industrial textile in a seventh embodiment of the invention.

FIG. 10 shows a further embodiment of the invention, in which seaming elements 410a, 410b are provided to the seaming area of a two-layer industrial textile comprised of a profiled film such as described in WO 2011/069259 to Manninen, which is folded at seamable ends 460a, 460b, the folded region comprising apertures (not shown) such that when the film is folded, a plurality of outer loops 420 are provided, for example as described in CA U.S. Pat. No. 2,749, 477 to Manninen. Seaming elements 410a, 410b are located within the profiled film so as to be suitably spaced apart from inner surfaces 424 of the folded film loops 420, to provide channels to receive a securing means. Seaming elements 410a, 410b are comprised of a polymer film which has been slit and profiled in a manner which renders the elements 410a, 410b compatible with the contours and apertures of the industrial textile into which they are inserted (i.e. the profile of the seaming elements matches that of the profiled film). The thickness of the film from which the seaming elements 410a, 410b are formed is selected so as to minimize any discontinuity at the seam region. For example, if the outside thickness of the seamable ends 460a, 460b is from about 1.5 mm to about 2.5 mm, and the thickness of the profiled film is from about 0.2 mm to about 0.35 mm (film thickness will depend on intended use application), then the thickness of the film used to form the seaming elements 410a, 410b should be similar, or from about 0.2 to 0.35 mm. This sizing will accommodate a pintle 450 having a diameter of from about 0.6 mm to about 1.0 mm without causing undue distortion at the seaming area.

Seaming elements 410a, 410b are secured in place, for example by bonding at bond regions 470. Bonding may be performed either prior to or following folding of the seaming elements 410a, 410b to provide loops 420. Inner surfaces 434 of loops 430a, 430b are separated so as to provide a similar, preferably the same, void space between the profiled film layers as exists throughout the entire fabric structure; this further minimizes opportunity for any discontinuity at the seam region. When the two seamable ends 460a, 460b are brought together, so that their loops 420 are interdigitated with respective ones of loops 430a, 430b, the open channels within outer loops 420 at seamable end 460a can be aligned with the open channels within seaming element 410b, and the open channels within outer loops 420 at seamable end 460b can be aligned with the open channels within seaming element 410a. The aligned open channels form two closed channels, and pintles 450 can be inserted through the closed channels to secure the seam, in the same manner as for the embodiments described above. When in use, any load applied to the industrial textile will now be evenly distributed between the loops 420 and the seaming elements 410a, 410b thereby minimizing opportunity for seam failure.

Figure 11:
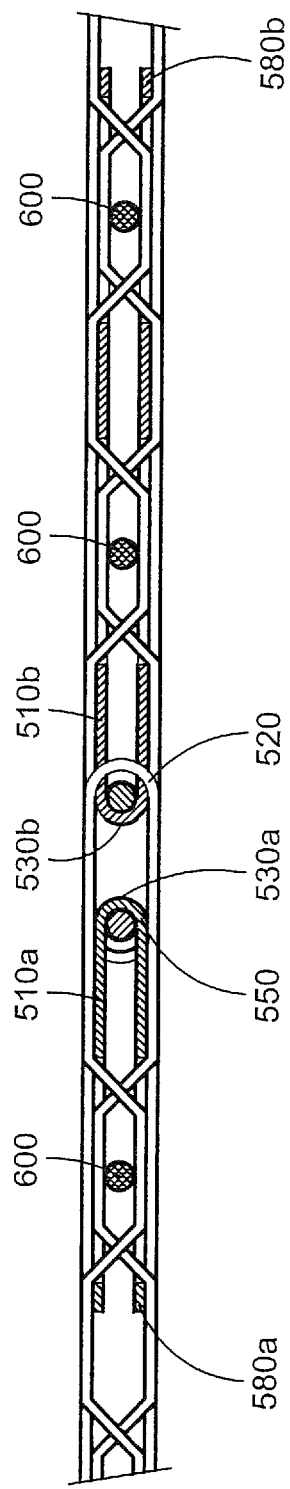
FIG. 11 is a cross-sectional view of a pair of seaming elements secured to an industrial textile in an eighth embodiment of the invention.

FIG. 11 shows a further embodiment of the invention, in which seaming elements 510a, 510b provide inner loops 530a, 530b within a folded profiled film having the same general structure and dimensions as in the embodiment shown in FIG. 10, and the inner and outer loops 520 are aligned in the same manner as in that embodiment so as to be secured by pintles 550. However, seaming elements 510a, 510b are provided with extended leg portions 580a, 580b which are shaped so as to match the contours of the profiled film, so that seaming elements 510a, 510b can be secured within the film by mechanical securing means such as yarns 600, provided in suitable spaces within the profiled configuration of the folded film. The length of extended leg portions 580a, 580b is selected in accordance with need. For example, if the fabric is intended for use in environments where it is expected to undergo excessive strain or tension, it may be advantageous to extend the leg portions 580a, 580b over multiple repeats or rows of the film profile embossing pattern so as to maximize seam tensile strength. As shown in FIG. 11, leg portion 580b extends over three rows of embossments in the film profile pattern, while leg portion 580a extends over only one behind the seam region. Yarns 600 are inserted in the open channels provided at locations where the embossments of both the seaming elements 510a, 510b and the profiled film fabric (not shown) are nested together so that, when assembled, the yarns 600 are locked in position between both components and act to attach each seaming element 510a, 510b within the profiled film industrial textile. Alternatively, the seaming elements can be bonded into position in the manner described in relation to FIG. 10. As a further alternative, both inserted yarns and bonding methods may be employed together to secure the seaming elements to the textile.

Where the regions of the seaming elements of the invention are to be secured, i.e. the loops to each other or to the textile, this can be effected by conventional means, including bonding, by welding, in particular laser welding, or by adhesives or other means, or mechanical securing as in the embodiment of FIG. 11, or by any suitable combination of these means, e.g. laser welding in combination with mechanical securing. If laser welding is the selected means, it is particularly advantageous to use laser weld enabled material including carbon black or other suitable laser energy absorbent; alternatively, such material can be applied separately to the appropriate surfaces. The use of laser weld enabled material is particularly suitable for the transition strip 80 in the embodiment shown in FIG. 6.

In selecting the film for seaming elements having a two-layer film construction, the thickness will be selected so that the finished thickness of the element will be as close as possible to that of the body of the fabric, so as to avoid or minimize any discontinuity at the finished seaming area.

Selection of materials for the seaming elements of the invention will depend on the intended end use of the finished textile, and on the need for compatibility with, and effective securing to, the body of the textile. Where the seaming element is a film construction of two or more layers, the polymer film can be different for some or each of the layers; for example, the outer layer can be made of a material more particularly resistant to adverse environmental factors.

We claim:

1. A seamed industrial textile comprising an industrial textile and a first seaming element and second seaming element:
   (i) the industrial textile having:
      a first seamable end having a first fold region comprising first textile loops; and
      a second seamable end having a second fold region comprising second textile loops; and
   (ii) each of the first seaming element and the second seaming element comprising a single securing member comprising a plurality of spaced-apart aligned open channel loops, the first seaming element being secured within the first fold region, in spaced-apart relationship from the first textile loops, and the second seaming element being secured within the second fold region, in spaced-apart relationship from the second textile loops,
      wherein the loops of the first seaming element are interdigitated and aligned with the second textile loops to define a first closed channel to receive a first securing means, and the loops of the second seaming element are interdigitated and aligned with the first textile loops to define a second closed channel to receive a second securing means.

2. The seamed industrial textile of claim 1, wherein the industrial textile has two layers and comprises a profiled film.

3. The seamed industrial textile according to claim 1, wherein each securing member comprises one layer of film.

4. The seamed industrial textile of claim 1, wherein each of the first and second securing means is a pintle.

5. The seamed industrial textile according to claim 1, the single securing member is secured to the industrial textile by yarns inserted through the securing member and selected profiled portions of the textile.

6. A seamed industrial textile comprising:
   an industrial textile having first and second seamable edge regions; and
   a pair of seaming elements for seaming the first seamable edge region to the second seamable edge region, each seaming element comprising a first lateral edge region and a second lateral edge region, wherein:
   (i) the second lateral edge region is constructed and arranged to be securably affixed to the first seamable edge region;
   (ii) the first lateral edge region comprises at least one securing member, each securing member comprising a plurality of spaced-apart aligned channelled loops, wherein either:
      (a) the first lateral edge region comprises a single securing member constructed and arranged to be secured within a first fold region provided at the first seamable edge region, in spaced-apart relationship from loops provided at the first fold region, wherein the loops of the securing member define a first channel and the loops at the first fold region define a second channel; or
      (b) the first lateral edge region comprises an outer securing member and at least one inner securing member, each securing member having loops; wherein:
         (b.1) the loops of the outer securing member are interdigitatable and alignable with the loops of one of the at least one inner securing member of a corresponding second seaming element securably affixed to the second seamable edge region of the textile, to define a first channel; and
         (b.2) the loops of one of the at least one inner securing member are interdigitatable and alignable with the loops of the outer securing member of the corresponding second seaming element, to define a second channel; and
   (iii) each of the first and second channels receives a securing means.

7. The seamed industrial textile according to claim 6, wherein each securing member comprises one layer of film.

8. The seamed industrial textile according to claim 6, wherein the seaming element comprises at least two securing members, wherein the outer securing member comprises a first layer of film, and each inner securing member comprises an additional layer of film.

9. The seamed industrial textile according to claim 8, wherein each securing member is secured to an adjacent securing member and an innermost inner securing member is constructed and arranged to be securable to the first seamable edge region of the industrial textile.

10. The seamed industrial textile according to claim 9, wherein each securing member is secured to an adjacent securing member by bonding.

11. The seamed industrial textile according to claim 10, wherein the bonding comprises laser welding.

12. The seamed industrial textile according to claim 9, wherein the first seamable edge region of the industrial textile comprises two layers and a transition strip located between the two layers at the first seamable edge region and extending beyond the first seamable edge region, and the innermost inner securing member is constructed and arranged to be securable at portions of an inner surface to the transition strip.

13. The seamed industrial textile according to claim 8, wherein the industrial textile is a woven textile, the first and second seamable edge regions each comprise a compressed region, and an innermost inner securing member is constructed and arranged to be securable at portions of an inner surface to the compressed region.

14. The seamed industrial textile according to claim 6, wherein the first lateral edge region comprises one inner securing member, and the outer securing member is integrally connected to the inner securing member.

15. The seamed industrial textile according to claim 6, wherein the industrial textile is a two layer industrial textile comprising a profiled film; and the single securing member constructed and arranged to be secured to the profiled industrial textile by yarns inserted through the securing member and selected profiled portions of the textile.

16. The seamed industrial textile according to claim 6, wherein the securing means is a pintle.

17. The seamed industrial textile according to claim 6, wherein each securing means comprises a pintle having a length exceeding a length of the respective channel, wherein protruding free ends of the pintle are secured back within the channel.

* * * * *